United States Patent
Hu et al.

(10) Patent No.: US 11,160,203 B2
(45) Date of Patent: Nov. 2, 2021

(54) AGRICULTURAL PLANTER AND INTER-FURROW STRAW MULCHER

(71) Applicant: Nanjing Research Institute for Agricultural Mechanization, Ministry of Agriculture, Jiangsu (CN)

(72) Inventors: Zhichao Hu, Jiangsu (CN); Fengwei Gu, Jiangsu (CN); Feng Wu, Jiangsu (CN); Youqing Chen, Jiangsu (CN); Hongbo Xu, Jiangsu (CN); Huanxiong Xie, Jiangsu (CN); Huichang Wu, Jiangsu (CN); Yinyan Shi, Jiangsu (CN); Weiwen Luo, Jiangsu (CN)

(73) Assignee: Nanjing Research Institute for Agricultural Mechanization, Ministry of Agriculture, Nanjing (CN)

( * ) Notice: Subject to any disclaimer, the term of this patent is extended or adjusted under 35 U.S.C. 154(b) by 254 days.

(21) Appl. No.: 16/532,921

(22) Filed: Aug. 6, 2019

(65) Prior Publication Data

US 2020/0236839 A1 Jul. 30, 2020

Related U.S. Application Data

(63) Continuation of application No. PCT/CN2018/110722, filed on Oct. 17, 2018.

(30) Foreign Application Priority Data

Aug. 1, 2018 (CN) .......................... 201810861380.6

(51) Int. Cl.
*A01C 7/06* (2006.01)
*A01B 49/02* (2006.01)
(Continued)

(52) U.S. Cl.
CPC ................ *A01C 7/06* (2013.01); *A01B 35/18* (2013.01); *A01B 49/022* (2013.01);
(Continued)

(58) Field of Classification Search
CPC ....... A01B 35/18; A01B 49/06; A01B 49/022; A01B 49/027; A01B 49/065;
(Continued)

(56) References Cited

U.S. PATENT DOCUMENTS 2,455,147 A * 11/1948 Traver .................. A01B 69/006
280/469
2,556,072 A * 6/1951 Bradley .................. A01B 49/00
111/200

(Continued)

FOREIGN PATENT DOCUMENTS

| CN | 202941107 | 5/2013 |
| CN | 104429236 | 3/2015 |

(Continued)

OTHER PUBLICATIONS

Written Opinion in PCT/CN2018/110722, dated Apr. 28, 2019.
(Continued)

*Primary Examiner* — Thomas B Will
*Assistant Examiner* — Ian A Normile
(74) *Attorney, Agent, or Firm* — Leason Ellis LLP

(57) ABSTRACT

The invention relates to an agricultural seeding machine, in particular to a straw crushing and inter-furrow collecting-mulching no-tillage seeder. A straw-crushing device, a guide device, a fertilizer discharging device, and a furrowing and seeding device are sequentially arranged on a rack from front to back. According to the guide device, a plurality of straw-crushing guide assemblies having installation positions capable of being horizontally adjusted are arranged on an adjustment crossbeam, are in a prow shape, and each
(Continued)

consist of a rear vertical back plate formed with a fertilization port, and two front symmetrical oblique guide plates. Straw is orderly spread on straw mulching belts between seeding belts while being crushed within the working range, and thus, the seeding belts are free of straw obstacles. The straw crushing and inter-furrow collecting-mulching no-tillage seeder is high in working integrity, easy to assemble, and low in energy consumption.

6 Claims, 3 Drawing Sheets

(51) Int. Cl.
 *A01C 7/00* (2006.01)
 *A01B 63/00* (2006.01)
 *A01B 49/06* (2006.01)
 *A01B 79/00* (2006.01)
 *A01B 79/02* (2006.01)
 *A01B 35/18* (2006.01)

(52) U.S. Cl.
 CPC .......... *A01B 49/027* (2013.01); *A01B 49/065* (2013.01); *A01B 63/004* (2013.01); *A01B 79/005* (2013.01); *A01B 79/02* (2013.01); *A01C 7/006* (2013.01)

(58) Field of Classification Search
 CPC ..... A01B 63/004; A01B 79/02; A01B 79/005; A01C 7/06; A01C 7/006
 See application file for complete search history.

(56) References Cited

U.S. PATENT DOCUMENTS

| | | | | | |
|---|---|---|---|---|---|
| 2,727,452 | A | * | 12/1955 | Abbott | A01B 35/12 172/298 |
| 3,352,261 | A | * | 11/1967 | Bonnell | A01B 49/04 111/8 |
| 3,797,418 | A | * | 3/1974 | Bridger, Jr. | A01C 5/06 111/186 |
| 4,044,841 | A | * | 8/1977 | Smith | A01B 33/021 172/72 |
| 4,324,295 | A | * | 4/1982 | Weichel | A01B 49/065 111/131 |
| 4,432,292 | A | * | 2/1984 | Scott | A01B 49/06 111/136 |
| 5,375,541 | A | * | 12/1994 | McGann | A01B 49/065 111/150 |
| 2018/0160614 | A1 | | 6/2018 | Knobloch | |

FOREIGN PATENT DOCUMENTS

| | | | | |
|---|---|---|---|---|
| CN | 105165269 | | 12/2015 | |
| CN | 105917774 | * | 6/2016 | ............ A01B 49/06 |
| CN | 106416483 | * | 2/2017 | ........... A01B 49/022 |
| CN | 106612668 | | 5/2017 | |
| CN | 107771467 | | 3/2018 | |
| CN | 107980368 | | 5/2018 | |
| CN | 108029290 | * | 5/2018 | ............... A01C 7/06 |

OTHER PUBLICATIONS

International Search Report and Written Opinion of corresponding PCT/CN2018/110722, dated Apr. 28, 2019, with English translation.

* cited by examiner

AGRICULTURAL PLANTER AND INTER-FURROW STRAW MULCHER

BACKGROUND OF THE INVENTION

1. Technical Field

The invention relates to an agricultural seeding machine, in particular to a seeding machine used for full straw-return fields.

2. Description of Related Art

About one billion tons of crop straw are generated every year in China and account for about 20% of global output. How to realize economical and effective utilization of the straw remains a great and important matter difficult to settle. Due to the sharp reduction of traditional fodder and fuel demand represented by farmers and the lack of new economical and effective recycling industry modes, full straw-return fields having straw returned therein without being collected or removed after crops are harvested have become a new common tillage mode in China. Under this background, a machine that can smoothly fulfill high-quality no-tillage seeding for next crops in the full straw-return fields and is low in energy consumption and simple in structure is always in urgent demand for seizing the farming season, reducing costs, increasing the multi-cropping index, fulfilling tillage-based quality improvements and conservation as well as straw burning, and protecting the ecology.

Main existing technical modes and corresponding problems thereof are as follows:

1. Straw-burying seeding technology: straw is crushed first, then all crushed straw is buried in soil by ploughing and rotary tillage, afterwards, land cultivation and preparation are carried out, and finally, seeding and fertilization are carried out. This technology mainly has the problems of high labor consumption and time consumption, high work costs and farming season delay, thereby being hardly adopted by farmers.

2. Straw-crushing rotary-tillage seeding technology or traditional no-tillage seeding technology: straw is crushed first, and then a rotary-tillage seeder or a traditional no-tillage seeder is used for seeding and fertilization. This technology mainly has the problems of straw blockage, trellis planting, seed airing, and failure to ensure the work smoothness and the seeding quality.

3. Seeding technology with straw returned on the land surface: straw is crushed, then part or all the crushed straw is picked up and conveyed, seeds are planted in straw-free soil in the straw conveying process, and finally, the crushed straw is returned to the surface of the soil in which seeds are planted. This technology mainly has the problems that the structure is complex and energy consumption is high while various functions are fulfilled; the straw return quantity cannot be accurately controlled when this technology is applied to full straw-return fields such as paddy fields having a large quantity of straw, and seedling deficiencies or weak seedlings can be caused if too much straw is returned.

In view of the existing seeding modes and the limitations of corresponding machines, transformations and improvements on existing technical modes and machine functions are urgently needed in this field.

BRIEF SUMMARY OF THE INVENTION

The objective of the invention is provide a machine adaptable to a new seeding mode to overcome the defects of the existing technologies: the straw-burying seeding technology, the straw crushing rotary-tillage seeding technology or traditional no-tillage seeding technology, and the seeding technology with straw returned on the land surface.

The objective of the invention is fulfilled through the following technical solution:

A straw crushing and inter-furrow collecting-mulching no-tillage seeder is connected to a rack through a suspension frame, and is characterized in that a straw-crushing device, a guide device, a fertilizer discharging device, and a furrowing and seeding device are sequentially arranged on the rack from front to back;

The straw-crushing device: a horizontal straw-crushing blade shaft is connected to the rack, a plurality of straw-crushing blades is circumferentially fixed to the straw-crushing blade shaft along the full length in a gapless manner, a semicircular straw-crushing blade housing is circumferentially arranged outside of the straw-crushing blades, and the tail of the straw-crushing blade housing is located on the same horizontal plane as the straw-crushing blade shaft;

The guide device: an adjustment crossbeam is arranged at the tail of the straw-crushing blade housing, a plurality of straw-crushing guide assemblies having the installation positions capable of being horizontally adjusted is arranged on the adjustment crossbeam and are in a prow shape, and each straw-crushing guide assembly consists of a rear vertical back plate formed with a fertilization port, and two front symmetrical oblique guide plates;

The fertilizer discharging device: a fertilizer tank is installed on the rack, and fertilizer dischargers located below the fertilizer tank are connected with the fertilization ports via fertilization tubes;

The furrowing and seeding device: a rear connecting frame is arranged behind the rack and is connected with a seeding rack having a seed tank installed thereon, and land wheels are arranged on two sides of the seeding rack; a plurality of seed dischargers corresponding to the straw-crushing guide assemblies in number is arranged below the seed tank; a plurality of furrowing devices corresponding to the straw-crushing guide assemblies in position and number is arranged below the seeding rack; the seed dischargers are connected with the furrowing devices via seed discharging tubes; and soil compaction devices are correspondingly arranged behind the seed dischargers.

In this technical solution, the straw crushing and inter-furrow collecting-mulching no-tillage seeder is connected with the rack through the suspension frame and is sequentially provided with the straw-crushing device, the guide device, the fertilizer discharging device, and the furrowing and seeding device from front to back, so as to work in the following way:

First, the plurality of straw-crushing blades is circumferentially arranged on the horizontal straw-crushing blade shaft along the full length in the gapless manner to crush straw, so that the seeder can crush straw within the full working range;

Second, as for crushed straw within the full working range, the adjustment crossbeam is arranged at the tail of the straw-crushing blade housing, the plurality of straw-crushing guide assemblies is arranged at preset positions of the straw-crushing blade housing and are in the prow shape, and each straw-crushing guide assembly consists of the rear vertical back plate provided with the fertilization port, and the two front symmetrical oblique guide plates.

This procedure is the key pioneering technology of the invention and fills the blank in the art in Chain and foreign countries.

The plurality of straw-crushing assemblies which has the installation positions capable of being horizontally adjusted and are in the prow shape is arranged on the adjustment crossbeam; crushed straw is ejected backwards after sliding down along the inner wall of the straw-crushing blade housing, wherein part of the crushed straw is ejected towards the straw-crushing guide assemblies and is then automatically diverted to the land surface on two sides of the straw-crushing guide assemblies under the ejection and sliding effect, and the rest of the crushed straw is directly ejected to the land surface on the two sides of the straw-crushing guide assemblies, straw-free seeding belts are formed inside the straw-crushing guide assemblies, and straw mulching belts are formed outside the straw-crushing guide assemblies, so that subsequent work is facilitated.

The included angle between the two symmetrical oblique guide plates, the inclination of the included sides of the guide plates, and the length of the guide plates are designed according to different varieties of crops and straw.

Straw-crushing guide assemblies of different specifications and widths can be prefabricated to be used as demanded.

If the width of the seeding belts needs to be changed frequently, width-adjustable straw-crushing guide assemblies can be manufactured. Particularly, the front ends of the two symmetrical oblique guide plates can be connected to rotate around an oblique rotary shaft, and the seeding belt becomes wider with the increase of the included angle between the two guide plates and becomes narrower with the decrease of the included angle between the two guide plates. Two opposite screw rods are rotatably connected into the two guide plates through horizontal double-headed reverse nuts, so that the included angle between the two guide plates can be conveniently adjusted. However, due to the fact that the front shaft is oblique, contact lines between the lower edges of the guide plates and the ground need to be angularly changed when the included angle between the guide plates is changed so as to ensure flat contact between the lower edges of the two guide plates and the ground, and in order to fulfill this effect, each guide plate needs to be divided into an upper piece and a lower piece, and the front ends of the guide plates are connected through a pin in an angle-adjustable manner.

The number of the guide assemblies installed on the crossbeam and the distance between the guide assemblies can be adjusted according to seeding requirements.

Moreover, the fertilizer tank is installed on the rack, and the fertilizer dischargers below the fertilizer tank are connected to the fertilization ports through the fertilization tubes; and it is a common practice to insert the fertilization tubes of the fertilizer dischargers into the fertilizer ports formed in the back plates of the straw-crushing guide assemblies.

Finally, as for furrowing and seeding, a rear connecting frame is arranged behind the rack and is connected with a seeding rack having a seed tank installed thereon, and land wheels are arranged on two sides of the seeding rack; a plurality of seed dischargers corresponding to the straw-crushing guide assemblies in number is arranged below the seed tank; a plurality of furrowing devices corresponding to the straw-crushing guide assemblies in position and number is arranged below the seeding rack; the seed dischargers are connected with the furrowing devices via seed discharging tubes; soil compaction devices are correspondingly arranged behind the seed dischargers; and these components are configured for seeding to complete the whole process.

"Collecting-mulching" in this application indicates that straw is collected for mulching after being crushed.

Furthermore, two symmetrical vertical shaping plates are connected to rear portions of the two symmetrical oblique guide plates of each straw-crushing guide assembly; and The back plates are formed with installation holes and are installed on the adjustment crossbeam.

Furthermore, the minimum distance between the guide plates and the outer diameter of rotation of the straw-crushing blades is 5-10 mm.

Furthermore, a rotary-tillage device is arranged between the fertilizer discharging device and the furrowing and seeding device;

The rotary-tillage device is installed on a seeding belt rotary blade shaft which is horizontally arranged on the rack; a rotary blade set is arranged corresponding to each said guide plate, and an arc-shaped rotary blade housing is arranged outside of the rotary blade sets and is fixedly connected with vertical barrier plates which are provided with long upward holes and disposed around the seeding belt rotary blade shaft.

Furthermore, a gearbox is arranged at the front end of the rack, a power output shaft of the gearbox is connected through belt transmission or chain transmission with the straw-crushing blade shaft and a bridge shaft located above the rotary blade housing in an axially parallel manner, and the bridge shaft is connected with the seeding belt rotary blade shaft through belt transmission or chain transmission.

Furthermore, the land wheels are connected with the seed dischargers through chain transmission, and the seed dischargers are connected with the fertilizer dischargers through chain transmission.

Furthermore, a front straw compression roller is arranged in front of the rack.

Furthermore, a rear straw compression roller is arranged between the back plates of the guide device and the rotary blade housing of the rotary-tillage device.

The invention has the following beneficial effects:

1. The creative guide device of the invention is adopted to perform a unique and key procedure of this patent and changes the operating mode in the prior art, and a new operating mode which is completely different from the existing technologies, namely the straw-burying seeding technology, the straw crushing rotary-tillage seeding technology or traditional no-tillage seeding technology, and the seeding technology with straw returned on the land surface, is put forward.

2. Straw is orderly spread on straw mulching belts between seeding belts while being thoroughly crushed within the working range, and thus, the seeding belts are free of straw obstacles; the straw crushing and inter-furrow collecting-mulching no-tillage seeder can fulfill creative smooth high-quality no-tillage straw-free obstacles seeding of full straw-return fields, can cover the land surface with straw to preserve the temperature and soil moisture and to isolate weed, and has the advantages of being high working integrity, easy to assemble and low in energy consumption.

3. The straw crushing and inter-furrow collecting-mulching no-tillage seeder can complete straw crushing, removal of straw between seeding belts, inter-furrow straw mulching, fertilization, seeding, and soil compaction synchronously, does not have too many restrictions on the straw type, harvesting way and straw quantity or previous crops and the crop variety of next crops, and can be widely applied to various operation and production conditions; and the seeding interval, the row number and the seeding width can be adjusted to meet various seeding requirements.

Figure 1:
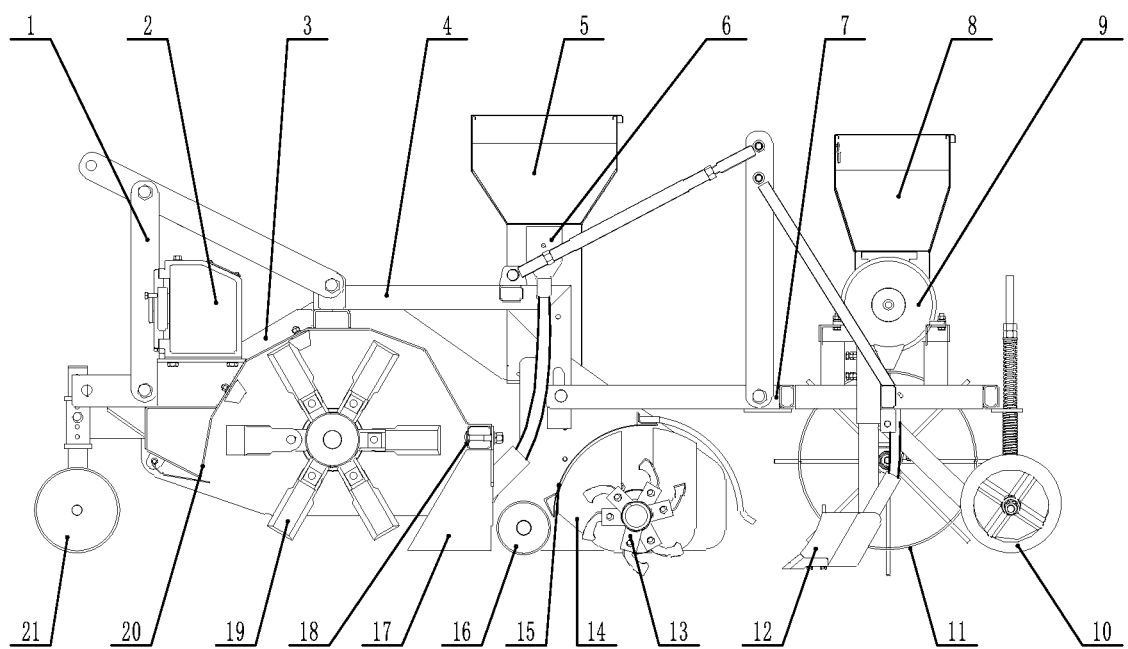
FIG. 1 is a side view of a straw crushing and inter-furrow collecting-mulching no-tillage seeder in one embodiment of the invention.
Figure 2:
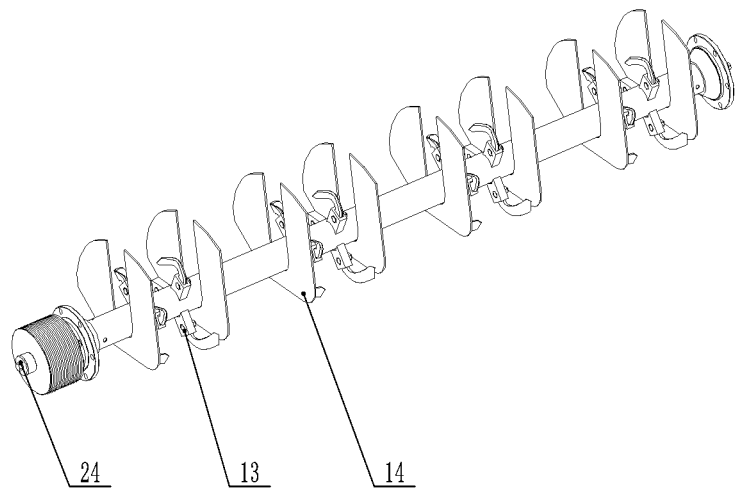
FIG. 2 is a configuration diagram of rotary blade sets and barrier plates in one embodiment of the invention.
Figure 3:
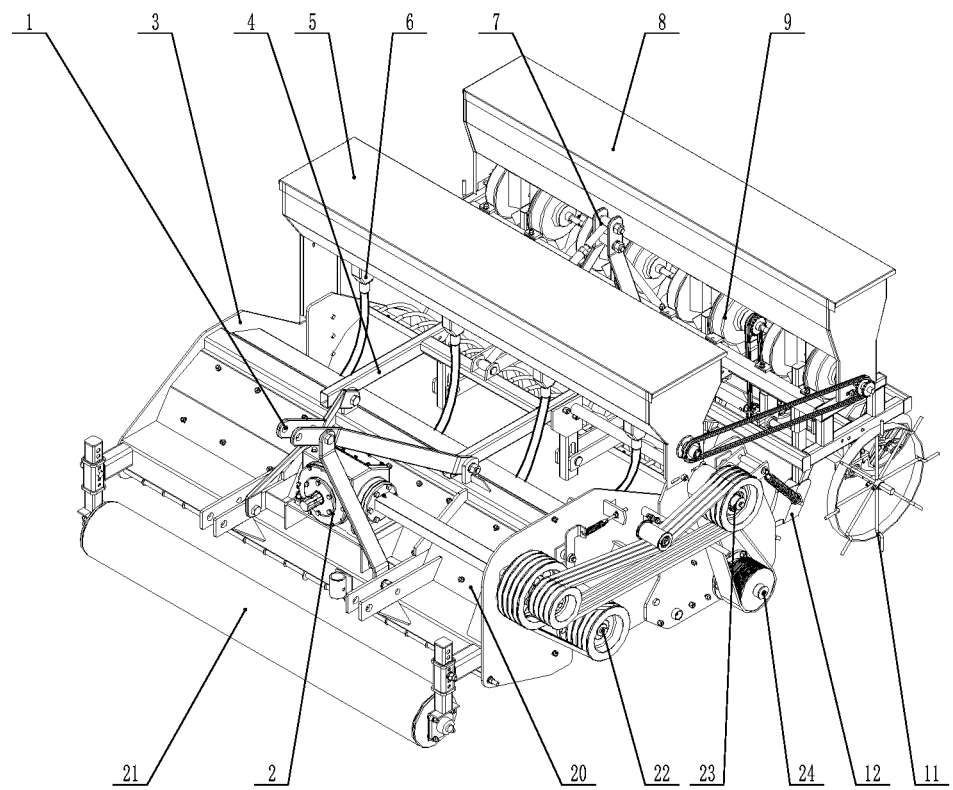
FIG. 3 is an overall perspective configuration view of the straw crushing and inter-furrow collecting-mulching no-tillage seeder when looked at from above in one embodiment of the invention.
Figure 4:
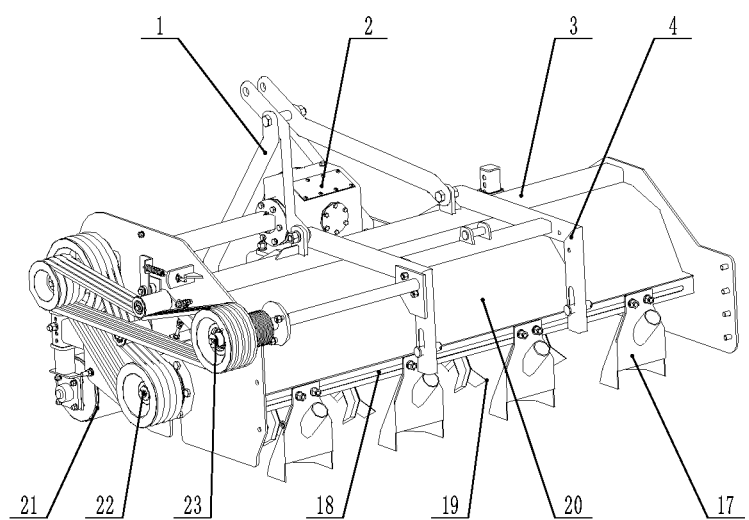
FIG. 4 is a perspective view of the straw crushing and inter-furrow collecting-mulching no-tillage seeder including a straw-crushing device and a guide device in one embodiment of invention and shows the connection structure of a gearbox, a power output shaft, a straw-crushing blade shaft, a bridge shaft and a rotary blade shaft.
Figure 5:
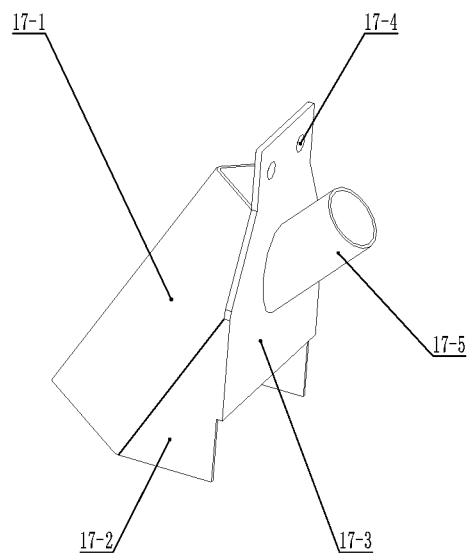
FIG. 5 is a perspective view of a straw-crushing guide device in one embodiment of the invention.
Figure 6:
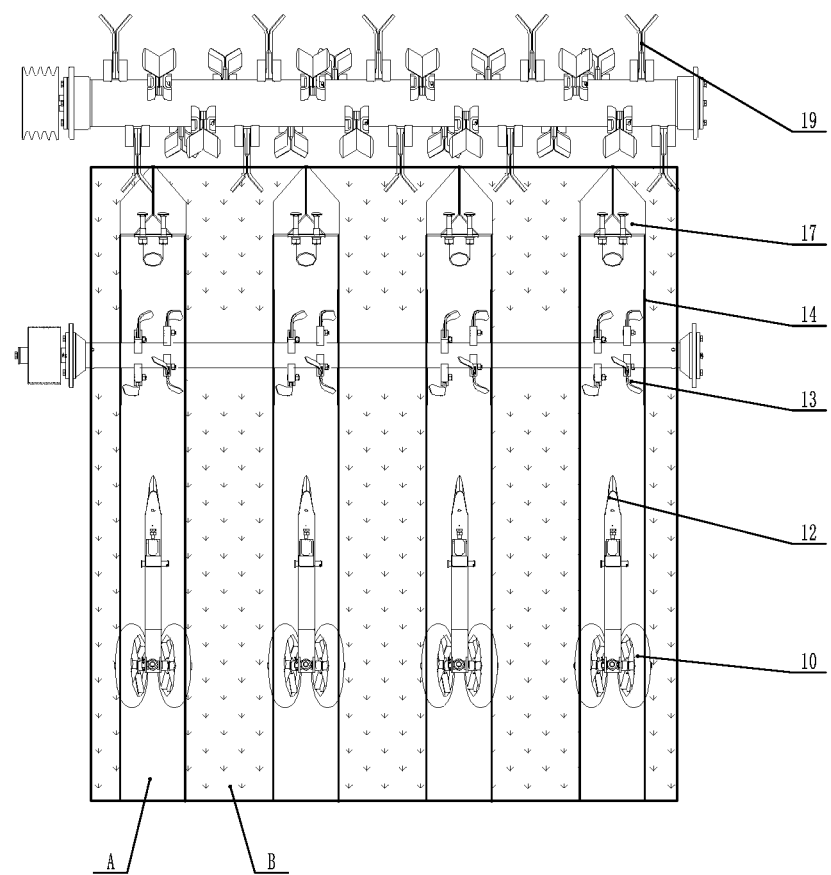
FIG. 6 is a planar position relation and operation effect diagram of operation components of the straw crushing and inter-furrow collecting-mulching no-tillage seeder of the invention.

In the figures: 1, suspension frame; 2, gearbox; 3, rack; 4, rear connecting frame; 5, fertilizer tank; 6, fertilizer discharger; 7, seeding rack; 8, seed tank; 9, seed discharger; 10, soil compaction device; 11, land wheel; 12, furrowing device; 13, rotary blade set; 14, barrier plate; 15, rotary blade housing; 16, rear straw compression roller; 17, straw-crushing guide assembly; 17-1, guide plate; 17-2, shaping plate; 17-3, back plate; 17-4, installation hole; 17-5, fertilization port; 18, adjustment crossbeam; 19, straw-crushing blade; 20, straw-crushing blade housing; 21, front straw compression roller; 22, straw-crushing blade shaft; 23, bridge shaft; 24, rotary blade shaft; A, seeding belt; B, straw mulching belt.

DETAILED DESCRIPTION OF THE INVENTION

The structure of the invention is further expounded below with reference to the accompanying drawings.

A straw crushing and inter-furrow collecting-mulching no-tillage seeder is connected to a rack 3 through a suspension frame 1, wherein a straw crushing device, a guide device, a fertilizer discharging device, and a furrowing and seeding device are sequentially arranged on the rack 3 from front to back;

The straw crushing device: a horizontal straw-crushing blade shaft 22 is connected to the rack 3, a plurality of straw-crushing blades 19 is circumferentially fixed to the straw-crushing blade shaft 22 along the full length in a gapless manner, a semicircular straw-crushing blade housing 20 is circumferentially arranged outside of the straw-crushing blades 19, and the tail of the straw-crushing blade housing 20 is located on the same horizontal plane as the straw-crushing blade shaft 22;

The guide device: an adjustment crossbeam 18 is arranged at the tail of the straw-crushing blade housing 20, a plurality of straw-crushing guide assemblies 17 having the installation positions capable of being horizontally adjusted is arranged on the adjustment crossbeam 18 and are in a prow shape, and each straw-crushing guide assembly 17 consists of a rear vertical back plate 17-3 formed with a fertilization port 17-5, and two front symmetrical oblique guide plates 17-1;

The fertilizer discharging device: a fertilizer tank 5 is installed on the rack 3, and fertilizer dischargers 6 located below the fertilizer tank 5 are connected with the fertilization ports 17-5 via fertilization tubes;

The furrowing and seeding device: a rear connecting frame 4 is arranged behind the rack 3 and is connected with a seeding rack 7 having a seed tank 8 installed thereon, and land wheels 11 are arranged on two sides of the seeding rack 7; a plurality of seed dischargers 9 corresponding to the straw-crushing guide assemblies 17 in number is arranged below the seed tank 8; a plurality of furrowing devices 12 corresponding to the straw-crushing guide assemblies 17 in position and number is arranged below the seeding rack 7; the seed dischargers 9 are connected with the furrowing devices 12 via seed discharging tubes; and soil compaction devices 10 are correspondingly arranged behind the seed dischargers 9.

Two symmetrical vertical shaping plates 17-2 are connected to rear portions of the two symmetrical oblique guide plates 17-1 of each straw-crushing guide assembly 17 so as to prevent crushed straw from being mixed into a seeding belt A behind the straw-crushing guide assembly 17, so that subsequent seeding work is facilitated, and the straw-crushing guide assembly 17 is structurally strengthened.

The back plates 17-3 are formed with installation holes 17-4 and are installed on the adjustment crossbeam 18, so that the back plates 17-3 constitute indispensable parts of the guide assemblies 17 and allow the fertilization tubes to be inserted therein, and moreover, the guide assemblies 17 can be conveniently and directly installed on the adjustment crossbeam 18 through connectors such as bolts.

The minimum distance between the guide plates 17-1 and the outer diameter of rotation of the straw-crushing blades 19 is 5-10 mm. As long as this distance is maintained, crushed straw can be thoroughly diverted and guided into straw mulching belts on two sides.

A rotary-tillage device is arranged between the fertilizer discharging device and the furrowing and seeding device. The seeder can be applied to various occasions. The rotary-tillage device can be conveniently installed between the fertilizer discharging device and the furrowing and seeding device to meet the rotary-tillage requirement.

The rotary-tillage device is installed on a seeding belt rotary blade shaft 24 which is horizontally arranged on the rack 3; a rotary blade set 13 is arranged corresponding to each guide plate 17-1, and an arc-shaped rotary blade housing 15 is arranged outside of the rotary blade sets 13 and is fixedly connected with vertical barrier plates 14 which are provided with long upward holes and disposed around the seeding belt rotary blade shaft 24. A conventional rotary-tillage device in the prior art can be adopted, but in order to adapt to the special solution of the invention, the rotary blade housing 15 is fixedly connected with the barrier plates 14, wherein the barrier plates 14 are special structural parts of this patent and are provided with the long upward holes so as to be assembled and disposed around the rotary blade shaft 24 from bottom to top, and each rotary blade set 13 carries out rotary-tillage between the two corresponding barrier plates 14, so that crushed straw is prevented from being brought or blown into seeding belts, and seedlings belts are kept free of crushed straw.

A gearbox 2 is arranged at the front end of the rack 3, a power output shaft of the gearbox 2 is connected through belt transmission or chain transmission with the straw-crushing blade shaft 22 and a bridge shaft 23 located above the rotary blade housing 15 in an axially parallel manner, and the bridge shaft 23 is connected with the seeding belt rotary blade shaft 24 through belt transmission or chain transmission. In this way, a compact, reliable, and economical power transmission structure and method are fulfilled.

The land wheels 11 are connected with the seed dischargers 9 through chain transmission, and the seed dischargers 9 are connected with the fertilizer dischargers 6 through chain transmission.

A front straw compression roller 21 is arranged in front of the rack 3 to improve the straw crushing quality.

A rear straw compression roller 16 is arranged between the back plates 17-3 of the guide device 17 and the rotary blade housing 15 of the rotary-tillage device to facilitate subsequent fertilization and seeding.

In conclusion, the straw crushing and inter-furrow collecting-mulching no-tillage seeder of the invention can completely crush straw within the working range and then orderly spread the crushed straw between the seeding belts, so that the seeding belts are free of straw obstacles, and seedbed sorting, fertilization, seeding and soil compaction are carried out in the seeding belts free of straw obstacles.

In one embodiment, a front straw compression roller 21 arranged in front of a rack 3, a suspension frame 1 is arranged above the rack 3, a gearbox 2 is arranged below the suspension frame 1, a straw-crushing blade housing 20 is arranged below the rack 3, a plurality of straw-crushing blades 19 which are circumferentially fixed to the outer side of a straw-crushing blade shaft 22 is arranged in the straw-crushing blade housing 20, an adjustment crossbeam 18 is arranged behind the straw-crushing blade housing 20, a straw-crushing guide device formed by four straw-crushing guide assemblies 17 and having the installation position capable of being adjusted is arranged on the adjustment crossbeam 18, and the minimum distance between the straw-crushing guide device and the outer diameter of rotation of the straw-crushing blades 19 is 10 mm Each crushed straw guide assembly 17 consists of a back plate 17-3, two symmetrical oblique guide plates 17-1, and two symmetrical vertical shaping plates 17-2, wherein an installation hole 17-4 is formed in the upper end of the back plate 17-3, and a fertilization port 17-5 is formed in the rear end of the back plate 17-3. A fertilizer tank 5 is arranged on the rear portion of the rack 3, and four fertilizer dischargers 6 are arranged below the fertilizer tank 5 and are connected with the fertilization ports 17-5 via fertilization tubes.

A bridge shaft 23 is arranged on one side of the rear portion of the rack 3, a rear straw compression roller 16 is arranged below and behind the rack 3, an arc-shaped rotary blade housing 15 is arranged behind the rear straw compression roller 16, a seeding belt rotary blade shaft 24 is arranged in the rotary blade housing 15, and four rotary blade sets 13 corresponding to the straw-crushing guide assemblies 17 in position are arranged on the seeding belt rotary blade shaft 24. Barrier plates 14 which perpendicularly penetrate through the seeding belt rotary blade shaft 24 are arranged on two sides of each rotary blade set 13 and are fixedly connected with the rotary blade housing 15.

A power output shaft of the gearbox 2 is connected with the straw-crushing blade shaft 22 and the bridge shaft 23 through belt transmission or chain transmission, and the bridge shaft 23 is connected with the seeding belt rotary blade shaft 24 through belt transmission or chain transmission.

A rear connecting frame 4 is arranged behind the rack 3, and a seeding rack 7 is connected with the rear connecting frame 4. A seed tank 8 is arranged above the seeding rack 7, four seed dischargers 9 are arranged below the seed tank 8, four furrowing devices 9 corresponding to the straw-crushing guide assemblies 17 in position are arranged below the seeding rack 7, and the seed dischargers 9 are connected with the furrowing devices 12 through seed discharging tubes. Four soil compaction devices 10 are correspondingly arranged behind the furrowing devices 12. Two land wheels 11 are arranged on two sides of the seeding rack 7 and are connected with the seed dischargers 9 through chain transmission, and the seed dischargers 9 are connected with the fertilizer dischargers 6 through chain transmission.

The number, positions and width of the straw-crushing guide assemblies 17 can be adjusted according to actual production requirements, and the number and positions of the rotary blade sets 14, the barrier plates 14, the furrowing devices 12, the fertilizer dischargers 6, the seed dischargers 9, and the soil compaction devices 10 can be adjusted accordingly. The components used for seeding belt rotary-tillage, fertilization, seeding, and soil compaction can be flexibly configured according to seeding requirements of different crops.

The invention is not limited to the above embodiment. On the basis of the technical solution disclosed above, substitutes and deformations of certain technical characteristics can be made by those skilled in the art without creative work according to the contents disclosed, and all these substitutes and deformations should also fall within the protection scope of the invention.

What is claimed is:

1. An agricultural planter and inter-furrow straw mulcher, comprising a rack connected to a suspension frame, wherein a straw crushing device, a guide device, a fertilizer discharging device, and a furrowing and seeding device are sequentially arranged on the rack;
    the straw crushing device comprising: a straw-crushing blade shaft being connected to the rack, a plurality of straw-crushing blades being circumferentially fixed to the straw-crushing blade shaft, and a straw-crushing blade housing being circumferentially arranged outside of the straw-crushing blades;
    the guide device comprising: an adjustment crossbeam being arranged adjacent to the straw-crushing blade housing, a plurality of straw-crushing guide assemblies being arranged on the adjustment crossbeam, the plurality of straw-crushing guide assemblies comprising a plurality of back plates, wherein each said straw-crushing guide assembly comprises a back plate of the plurality of back plates, formed with a fertilization port, and two guide plates;
    the fertilizer discharging device comprising: a fertilizer tank being installed on the rack, and fertilizer dischargers being connected with the fertilization ports via fertilization tubes;
    the furrowing and seeding device comprising: a rear connecting frame being connected with a seeding rack having a seed tank installed thereon, land wheels being arranged on two sides of the seeding rack, a plurality of seed dischargers being arranged below the seed tank, a plurality of furrowing devices being arranged below the seeding rack, wherein the plurality of seed dischargers are connected with the furrowing devices via seed discharging tubes; and wherein soil compaction devices are arranged adjacent to the seed dischargers,
    wherein a rotary-tillage device is arranged between the fertilizer discharging device and the furrowing and seeding device, wherein the rotary-tillage device is installed on a seeding belt rotary blade shaft which is arranged on the rack; wherein each of a plurality of rotary blade sets is arranged corresponding to each said guide plate, and wherein a rotary blade housing is arranged outside of the plurality of rotary blade sets and is fixedly connected to vertical barrier plates which are disposed around the seeding belt rotary blade shaft, wherein a rear straw compression roller is arranged between the plurality of back plates of the guide device and the rotary blade housing of the rotary-tillage device.

2. The agricultural planter and inter-furrow straw mulcher according to claim 1, wherein two symmetrical vertical shaping plates are connected to rear portions of the two guide plates of each said straw-crushing guide assembly; and wherein each back plate of the plurality of back plates is installed on the adjustment crossbeam.

3. The agricultural planter and inter-furrow straw mulcher according to claim 1, wherein a minimum distance between the guide plates and an outer diameter of rotation of the straw-crushing blades is at least 5 mm.

4. The agricultural planter and inter-furrow straw mulcher according to claim 1, wherein a gearbox is arranged at an end of the rack, wherein a power output shaft of the gearbox is connected through belt transmission or chain transmission with the straw-crushing blade shaft and a bridge shaft located above the rotary blade housing, and wherein the bridge shaft is connected with the seeding belt rotary blade shaft through belt transmission or chain transmission.

5. The agricultural planter and inter-furrow straw mulcher according to claim 1, wherein the land wheels are connected with the seed dischargers through chain transmission, and wherein the seed dischargers are connected with the fertilizer dischargers through chain transmission.

6. The agricultural planter and inter-furrow straw mulcher according to claim 1, wherein a front straw compression roller is arranged in front of the rack.

* * * * *